Sept. 5, 1967  J. H. W. YAKEL ETAL  3,339,306
MOUSETRAPS
Filed March 17, 1965
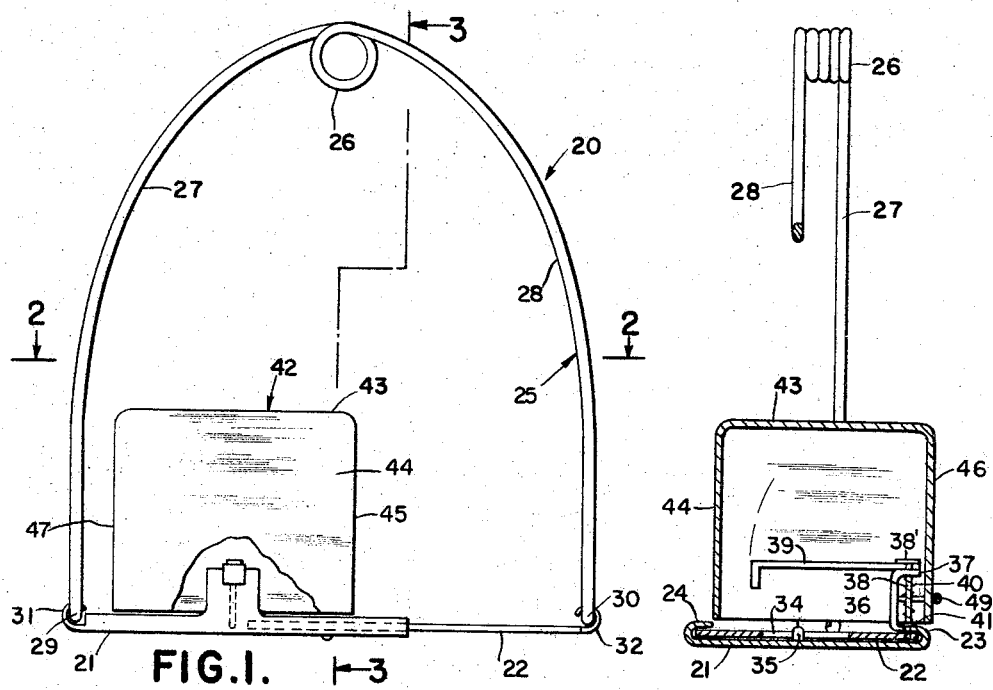
FIG.1.
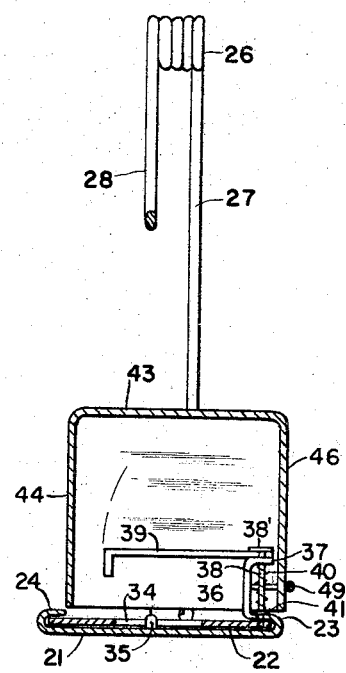
FIG.3.
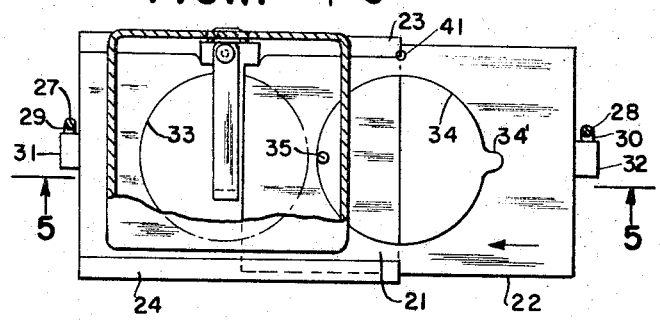
FIG.2.
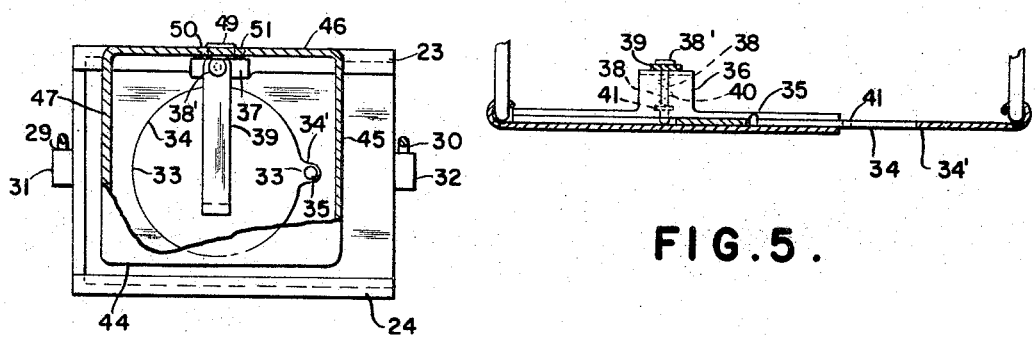
FIG.4.
FIG.5.

United States Patent Office 3,339,306
Patented Sept. 5, 1967

3,339,306
MOUSETRAPS
John Henry William Yakel and Frederick Otto Yakel, both of 4291 NW. 36th St., Miami, Fla. 33166
Filed Mar. 17, 1965, Ser. No. 440,424
1 Claim. (Cl. 43—85)

ABSTRACT OF THE DISCLOSURE

A mouse trap in which the animal is prevented from moving when caught between the sliding movement of two telescoping plates. The plates are in face to face relation to each other and the plates are provided entrance openings adapted to be aligned and through which part of the animal may enter. The two plates are spring biased in opposite directions and are held with their entrance openings aligned by a trigger which is released when the animal disturbs a bait, whereby the entrance openings in the respective plates are moved out of alignment relative to each other and thereby clamping the animal.

This invention relates to trapping equipment, more particularly the invention relates to mousetraps.

It is an object of the invention to provide a novel trap which can trap an animal by a pair of bores in sliding relation to one another and which one aligned with one another when the trap is loaded and which slide apart from one another when triggered in a scissoring action to engage and trap the animal therebetween.

It is a further object of the invention to provide a novel trap having sliding bores which are operated by a spring rod to slide apart from one another and catch or engage or trap the animal therebetween.

Further objects and advantages of the invention will become apparent as the description proceeds and when taken in conjunction with the accompanying drawings wherein:

FIGURE 1 is a side elevational view of the novel mousetrap invention, shown in its tripped position.

FIGURE 2 is a cross sectional view of the novel mousetrap invention, taken along line 2—2 of FIGURE 1.

FIGURE 3 is a cross-sectional view of the trapping invention taken along line 3—3 of FIGURE 1.

FIGURE 4 is a top view of the mousetrap invention, with the mousetrap in its loaded position.

FIGURE 5 is a cross-sectional view of the invention taken along lines 5—5 of FIGURE 2, disclosing the details of the triggering mechanism.

Briefly stated the invention comprises a pair of telescoping flat plates, with one plate forming a guideway for the other plate and with both plates having bores which align with one another when retracted, and spring connected to the outer ends of the plates and urging the plates apart, and a trigger retaining the plates in the retracted position, a box surrounding the triggering mechanism, so that the animal can only trigger the release of the plates when the animal is in the bores of the plate and the releasing of the plates will cause the plate bores to engage and catch the animal.

With further more detailed reference to the drawings in FIGURE 1, the trap invention 20 has a pair of flat plates 21 and 22, with the plate 21 having inturned flanges 23 and 24 along opposite sides of the plate to provide a guideway for the plate 22 to move toward and away from plate 21.

A spring rod 25 is formed into a bow with a wound coil center portion 26 urging the arms 27 and 28 outward and away from one another. At the lower ends of the arms 27 and 28 are L-shaped ends 29 which are fitted into the sockets formed by the rounded inturned flanges 31 and 32 at the opposite ends of plates 21 and 22 respectively. Plate 21 has a circular hole 33 and plate 22 also has a circular hole 34 of the same diameter as the hole 33.

Plate 21 also has a projecting pin 35 fixed to plate 21 which limits the movement of plate 22 with respect to plate 21. The plate 22 also has a notch 34' in the hole 34, so that the holes or bores 33 and 34 can align coaxially when the plates are compressed together as shown in FIGURE 4. The pin 35 will engage the edge of the plate 22 at the notch 34' to prevent the plates from telescoping together any more than shown in FIGURE 4. Plate 21 also has an upwardly extending flange 36 formed integrally with the guideway flange 23. At the top of the flange 36 is an outwardly turned ledge portion 37 formed integrally with the upward flanges 36. A pin 38 has an enlarged head portion 38' with the rod 38'' of the pin passing through a small bore slightly oversized with respect to the pin, and at one end of the arm 39. The pin 38 has a spring 40 telescoped over the pin, and a projecting ring or ridge 41 along the lower portion of the pin abuts the spring 40. The lower end of the pin 38 passes through a bore in flange 23. The plate 34 also has a small hole 41 which receives the lower end of the pin 38, when the plates are compressed thereby locking the plates together as shown in FIGURE 4.

A rectangular box 42, has a top portion 43, and four sides 44, 45, 46, and 47, and an open bottom 48. The box 42 is secured to the upward flange by a wire 49, secured at its ends to the upward flange 36, and its intermediate portion passing out one hole 50 and back through another hole 51.

The box 42 surrounds the arm 39 so that the arm 39 cannot be raised by the animal, except through the holes 33 and 34.

The trap is operated by placing bait on the arm 39. The trap is then set by the operator pressing the arms 27 and 28 toward one another from the position shown in FIGURE 1, which slides the plates 21 and 22 toward one another. The plate 22 at its forward edge 22' engages the lower end of the pin 38 urging it upward. Thereby enabling the plates 21 and 22 to be compressed or retracted together until they reach their position shown in FIGURE 4. When the plates reach their position shown in FIGURE 4, the hole 41 will be aligned with the pin 38 and the spring 40 will urge the pin downward into the hole 40, thereby locking the plates 21 and 22 together.

The animal trap will then be placed on its side so that the plates 21 and 22 rest along the edge of either flanges 23 or 24. A mouse or animal attempting to get the bait on the arm 39 will enter through the holes 33 and 34 and will move the arm 39 upward from its position shown in FIGURE 3 the raising of the arm 39 raises the head 38' of the pin 38 thereby removing the lower end of the pin 38 from the hole 41. This releases the plates 21 and 22 and the spring arms 27 and 28 will telescope the plates 22 and 23 apart to their tripped position, and the holes 33 and 34 in separating will catch the body of the animal therebetween.

It will be obvious that various changes and departures may be made to the invention without departing from the spirit and scope thereof and accordingly it is not intended that the invention be limited to that specifically described in the specification or illustrated in the drawing but only as set forth in the appended claim wherein what is claimed is:

A mousetrap comprising a pair of elongated flat plates, one plate having inturned sides along its length forming a guideway for slidingly receiving the other plate, a bowed spring rod having its outer ends connected to said plates and urging said plates apart, said plates each having an entrance opening adapted to align with one another when said spring rod is compressed, said one plate having a pin reciprocably mounted in a portion of said inturned sides, spring means urging said pin downward, said other plate having a pin hole adapted to receive said pin to lock said plates together, an arm mounted to said pin and adapted to raise said pin, with the raising of said pin releasing said plates and allowing said entrance openings to become misaligned, and a rectangular box surrounding said arm.

References Cited

UNITED STATES PATENTS

| | | | |
|---|---|---|---|
| 472,687 | 4/1892 | Winkler | 43—61 |
| 1,222,406 | 4/1917 | Jakab | 43—61 |
| 2,059,164 | 10/1936 | Woods | 43—78 |
| 2,460,417 | 2/1949 | Goostrey | 43—61 |
| 2,603,029 | 7/1952 | Anderson | 43—85 |

SAMUEL KOREN, *Primary Examiner.*

WARNER H. CAMP, *Examiner.*